United States Patent [19]
Richardson

[11] Patent Number: 5,924,336
[45] Date of Patent: Jul. 20, 1999

[54] HOLLOW BICYCLE CRANKSHAFT

[76] Inventor: Brian E. Richardson, 3445 Oakwook Ct., Morgan Hill, Calif. 95037

[21] Appl. No.: 08/608,085

[22] Filed: Feb. 28, 1996

Related U.S. Application Data

[63] Continuation of application No. 08/168,842, Dec. 16, 1993, abandoned.

[51] Int. Cl.[6] .................................................. G05G 1/14
[52] U.S. Cl. ...................... 74/594.1; 403/370; 403/374.4
[58] Field of Search ............................... 74/594.1, 594.2, 74/594.4; 403/370, 374, 367, 368, 375, 354; 411/24, 25, 75, 80

[56] References Cited

U.S. PATENT DOCUMENTS

| | | | |
|---|---|---|---|
| 278,972 | 6/1883 | Kimball | 74/594.1 X |
| 648,077 | 4/1900 | Ludlow | 74/594.2 |
| 1,398,883 | 11/1921 | Mottlau | 74/594.2 |
| 4,358,967 | 11/1982 | Kastan | 74/594.1 X |
| 4,651,590 | 3/1987 | Thun | 74/594.1 |
| 4,704,919 | 11/1987 | Durham | 74/594.1 |
| 4,816,009 | 3/1989 | Philipp | 74/594.1 X |
| 5,201,242 | 4/1993 | Chi | 403/370 |

FOREIGN PATENT DOCUMENTS

| | | | |
|---|---|---|---|
| 565747 | 10/1993 | European Pat. Off. | 74/594.1 |
| 17977 | of 1897 | United Kingdom | 74/594.1 |

*Primary Examiner*—John A. Jeffery
*Assistant Examiner*—Mary Ann Battista
*Attorney, Agent, or Firm*—The Kline Law Firm

[57] ABSTRACT

A hollow bicycle crankshaft includes a hollow shaft assembly having a first shaft member fastened to a second shaft member, a hollow left crank arm, a hollow right crank arm, a tubular housing member, a first shaft bearing, a second shaft bearing, and a sprocket bracket. The first shaft member matingly engages the second shaft member. Non-mating ends of the shaft assembly are attached to respective hollow crank arms, where the shaft extends through an aperture in each arm. The union of the first and second shaft members is proximate the midsection of the constructed shaft assembly. The shaft assembly is housed within the tubular housing member. The first and second shaft bearings, disposed at each end of the housing member, secure the tubular housing member about the shaft assembly in coaxial and concentric alignment. The first shaft bearing is disposed at the end of the housing member that is adjacent to the sprocket bracket, and is larger than the second shaft bearing which is disposed on the opposing side of the housing member.

19 Claims, 3 Drawing Sheets

HOLLOW BICYCLE CRANKSHAFT

RELATED APPLICATIONS

This is a continuation of application Ser. No. 08/168,842 filed on Dec. 16, 1993, now abandoned.

BACKGROUND OF THE INVENTION

1. Field of the Invention

The present invention relates generally to bicycle drive systems, and more particularly, to a hollow shaft and crank arm assembly comprising a tubular housing surrounding first and second shaft members that are matingly engaged.

2. Description of the Background Art

Common bicycle drive systems typically comprise a solid cylindrical shaft connected to solid crank arms. However, in today's market, cyclists desire the reduced drag and increased acceleration benefits provided by reduced weight bike parts. Reduction in weight is accomplished using tubular shafts and hollow crank arms instead of solid shafts and crank arms, respectively. To further reduce the weight, lighter, composite materials have been substituted for the more commonly used heavy metals.

For example, U.S. Pat. No. 2,350,468 describes a crankshaft assembly utilizing hollow crank arms attached to a solid shaft housed in a metallic sleeve. The weight of the solid shaft is not addressed. The solid metal shaft adds undesirable weight to the crankshaft assembly, and the undesirable weight adversely affects bicycle acceleration.

U.S. Pat. No. 4,704,919 describes a two piece crankshaft for a bicycle; the crankshaft comprises a first fixed crank arm welded to one end of a tubular spindle with a spline at its other end. A second removable crank arm is welded to an internally splined boss which engages the splined end of the spindle. This configuration does not permit maximum translation of pedal force to rotation force because the spline junction is disposed at the end of the spindle. While the use of a hollow spindle reduces the overall weight of the crankshaft assembly, the spline junction of the second crank arm to the shaft does not provide the assembly with maximum strength because the junction is disposed proximate an end of the removable crank arm, which is an area of the crankshaft assembly that receives the greatest loads. Because the strength of the crankshaft assembly is reduced by the design of the spline junction, the useful life of the crankshaft assembly is limited. Lastly, the splines on the spindle end and second removable crank arm are more expensive to manufacture than a plain cylindrical shaft end, and thus, increase the overall cost of manufacture for the crankshaft assembly.

U.S. Pat. No. 4,811,626 discloses a hollow crank arm comprising three separate inter-assembled segments made of composite material. The use of composite material decreases the overall weight of the crank arm, and concomitantly the weight of the crankshaft assembly. However, the use of composite material is very expensive and greatly increases the cost of manufacture of the part.

As none of the prior art discussed above successfully provides a crankshaft assembly having the lightweight and high strength characteristics desired by cyclists, what is needed is a light weight crankshaft assembly that includes hollow crank arms and a tubular shaft, that has a simple design to reduce manufacturing costs, and that is made of material having a high strength to weight ratio. Further, there is a need for a crankshaft assembly having the junction coupling the right and left crank arms positioned away from the area of greatest load upon the crankshaft assembly to maximize the strength and useful life of the crankshaft assembly.

SUMMARY OF THE INVENTION

A preferred embodiment of the hollow bicycle crankshaft of the present invention comprises a hollow shaft assembly, fastening means, a hollow left crank arm, a hollow right crank arm, a tubular housing member, a first shaft bearing, a second shaft bearing, and a sprocket bracket. The shaft assembly is housed within the tubular housing member. Together the shaft assembly and housing member are commonly called a 'bottom bracket assembly' in the bicycle manufacturing trade. The hollow shaft assembly further comprises a tubular first shaft member which matingly engages a tubular second shaft member. Non-mating ends of the shaft assembly are attached to a first end of the left crank arm and a first end of the right crank arm, where the shaft extends through an aperture in each arm such that each arm surroundingly fastens to a non-mating shaft end. The use of a hollow shaft assembly and hollow crank arms reduces the overall weight of the crankshaft assembly. The union of the first and second shaft members is proximate a midsection of the constructed shaft assembly, where the torque stress on the shaft assembly is the least.

The first and second shaft bearings are disposed at first and second ends, respectively, of the housing member, and secure the tubular housing member about the shaft assembly in coaxial and concentric alignment. In additional to torsional loads, the shaft bearings and the shaft assembly endure bending moments resulting from the alternating downward load on the crank arms which forces the crankshaft assembly to rotate. Positioning the shaft bearings at the ends of the housing member reduces the bending loads on the shaft assembly and bearings by creating a smaller moment arm. Further, by positioning the bearings outside the ends of the tubular housing member as opposed to between the inner surface of the tubular housing member and the outer surface of the shaft assembly, a larger than standard diameter housing member having a reduced wall thickness may be used, which further reduces the overall weight of the crankshaft assembly.

The first shaft bearing is disposed at the end of the tubular housing member that is adjacent to the sprocket bracket, and is larger than the second shaft bearing which is disposed on the opposing side of the housing member. There are greater torsional loads on the bearing that is adjacent to the sprocket bracket because the sprocket bracket transfers the greatest amount of energy, generated during rotation of the crankshaft assembly, to the drive means of a bicycle. To accommodate the heavier loads, the first shaft bearing is larger than the second shaft bearing. The smaller size of the second shaft bearing further lightens the overall weight of the crankshaft assembly.

DETAILED DESCRIPTION OF THE PREFERRED EMBODIMENT

Figure 1:
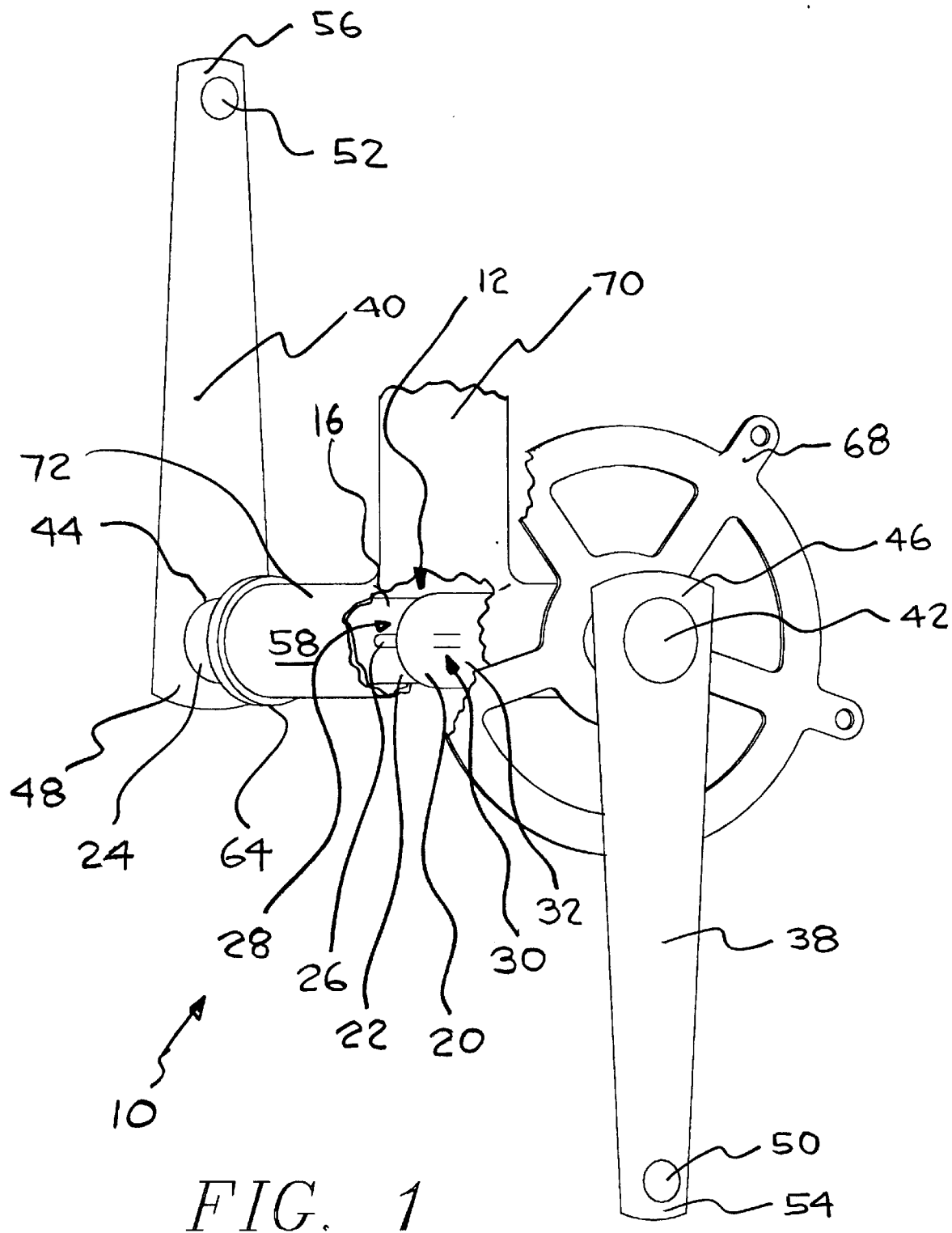
FIG. 1 is a perspective view of a crankshaft assembly constructed in accordance with the present invention.

FIG. 1 is a perspective view of a hollow bicycle crankshaft 10 constructed in accordance with the preferred embodiment of the present invention. A hollow shaft assembly 12 is comprised of two segments, a first shaft member 14 and a second shaft member 16, which are made of cylindrical metal tubing. The first shaft member 14 includes a second shaft end 20. The second shaft member 16 has a third shaft end 22 and a fourth shaft end 24. The inner diameter of the first shaft member 14 preferably ranges between 0.75 inches and 1.125 inches. The second shaft end 20 of the first shaft member 14 receivingly engages the third shaft end 22 of the second shaft member 16 such that the parts 14,16 are coaxially aligned, and the second and third shaft ends 20,22 are concentrically mated, with approximately a one inch overlap. The outer diameter of the second shaft member 16 is relative to, and slightly smaller than, the diameter of the first shaft member 14. The overlap of the first and second shaft members 14,16 approximates the same aspect ratio as the inner diameter of the first shaft member 14, such that where the inner diameter of the first shaft member 14 is one inch, the overlap of the second and third shaft ends 20,22 are preferably also one inch.

Although the preferred embodiment is comprised of steel, it would be obvious to one skilled in the art that composite materials, high strength plastics, and the like could equivalently be used in the manufacture of the present invention.

A key slot 26 is formed through the second shaft member 16 from proximate the midsection 28 of the second shaft member 16 to the third shaft end 22, and is disposed in parallel with the longitudinal axis of the second shaft member 16. A depression 30 is formed on the outer surface 32 of the first shaft member 14. The key slot and depression form a key slot assembly, which will be described in further detail with the discussion of FIG. 3.

The fourth shaft end 24 is affixed to a hollow left crank arm 40, and projects into the hollow center of the crank arm 40 through an aperture 44 formed at a first end 48. The aperture 44 has a cylindrical shape and has a longitudinal axis that is disposed at a right angle to the longitudinal axis of the left crank arm 40. The right crank arm 38 includes an aperture 42 formed at a first end 46. The aperture 42 is disposed at a right angle to the longitudinal axis of the right crank arm 38.

Holes 50 and 52 are formed at second ends 54 and 56 of the right and left crank arms 38,40, each of which has a cylindrical shape and a longitudinal axis that is disposed at a right angle to the longitudinal axis of the respective crank arm 38,40. In an alternative embodiment, standard, clip-type or clipless pedals are permanently or removably attached to the crank arms 38,40 at the holes 50,52.

A tubular housing member 58 surrounds the shaft assembly 12. The tubular housing member 58 is shown partially broken away to reveal the shaft assembly 12 that is disposed within the tubular housing member 58 coaxially with the longitudinal axis of the tubular housing member 58. A second housing member end 64 is attached to the second shaft member 16 proximate the fourth shaft end 24 by a second shaft bearing 66.

A sprocket bracket 68 is attached to the first shaft member 14 proximate the right crank arm 38. The sprocket bracket 68 is provided for attaching bicycle drive means, such as a chain and sprocket assembly, to the hollow bicycle crankshaft 10.

A frame member 70 is affixed to the outer surface 72 of the housing member 58. A portion of the frame member 70 is shown broken away to reveal the shaft assembly 12. The frame member 70 is part of a fixed frame system (not shown) that provides the main structure of a bicycle. As the crank arms 38,40 are rotated, the shaft assembly 12 which is attached to the first ends 46,48 of the crank arms 38,40, respectively also rotates. The shaft bearing 66 that attaches the housing member 58 to the shaft assembly 12 allows the shaft assembly 12 to rotate, while the housing member 58 is kept stationary by the frame member 70.

Figure 2:
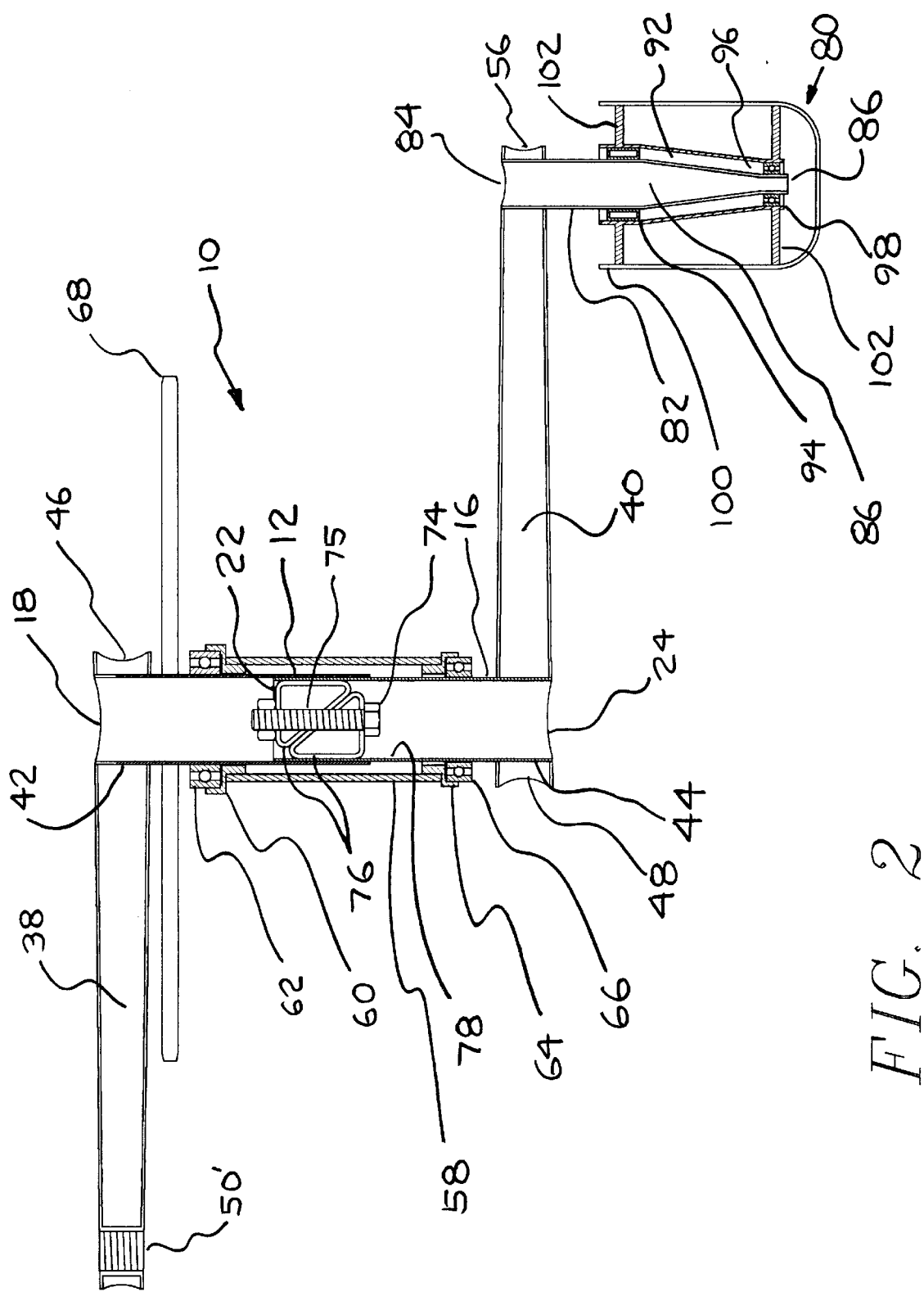
FIG. 2 is a cross sectional view of the crankshaft assembly of FIG. 1 showing fastening means within the shaft as an expansion block assembly, and further including a pedal attached to a left crank arm.

FIG. 2 is a cross sectional view of the hollow bicycle crankshaft 10 of FIG. 1. The second shaft end 20 of the first shaft member 14 surroundingly engages the third shaft end 22 of the second shaft member 16. A first shaft end 18 (hidden from view in FIG. 1) mates with, and is welded to, the aperture 42 formed in the first end 46 of the right crank arm 38. The fourth shaft end 24 mates with, and is attached to, the aperture 44 formed in the first end 48 of the left crank arm 40. In an alternative embodiment of the present invention, the hole 50' is internally threaded for removably attaching a pedal assembly having a mating externally threaded pedal shaft.

The sprocket bracket 68 is permanently secured to the first shaft member 14 proximate the first shaft end 18 between the first shaft bearing 62 and the right crank arm 38, and is disposed in alignment with the shaft assembly 12. The housing member 58 provides a means for covering the shaft assembly 12, as it concentrically and coaxially surrounds the shaft assembly 12 to protect the shaft assembly from damage and dirt. A first housing member end 60 is attached to the first shaft member 14 proximate the first shaft end 18 by the first shaft bearing 62. The second housing member end 64 is attached to the second shaft member 16 proximate the fourth shaft end 24 by a second shaft bearing 66. The combination of the housing member 58, shaft assembly 12 and first and second shaft bearings 62,66 is commonly called a 'bottom bracket' in the bicycle manufacturing trade.

The shaft bearings 62,66 allow the shaft assembly 12 to rotate within the stationary housing member 58. The load on the first shaft bearing 62 is transferred from the shaft assembly 12 and the sprocket bracket 68, while the load on the second shaft bearing 66 is transferred only from the shaft assembly 12. The first shaft bearing 62 is preferably sized to accommodate the expected load from the shaft assembly 12 and sprocket bracket 68. The second shaft bearing 66 is preferably smaller in size than the first shaft bearing 62, and is concomitantly lighter in weight than the first shaft bearing 62. The inclusion of a diminutive second shaft bearing 66 further reduces the overall weight of the hollow bicycle crankshaft 10 of the present invention.

Fastening means 74 are disposed within the shaft assembly 12 at the second and third shaft ends 20,22. When the first and second shaft members 14,16 are assembled to construct the shaft assembly 12, the fastening means 74 secure the engagement between the second and third shaft ends 20,22. An expansion block assembly 75 is shown as an example of fastening means 74. The expansion block assembly 75, positioned within the hollow third shaft end 22 of the second shaft member 16, is tightened (screwed in) so that the block arms 76 press against the inner surface 78 of the second shaft member 16. The outward pressure from the expansion block assembly 75, together with the expansion flexibility of the third shaft end 22 provided by the key slot 26 (hidden behind the tightening bolt of block assembly 75 in FIG. 2), forces the third shaft end 22 of the second shaft member 16 to expand in diameter until a secure interference fit is achieved between the second and third shaft ends 20,22. Although an expansion block assembly 75 is illustrated as the fastening means 74, it is anticipated that any other type of fastening means could be equivalently used.

The first shaft member 14 is joined with the second shaft member 16 to comprise the shaft assembly 12. The union of the second shaft end 20 of the first shaft member 14 and the third shaft end 22 of the second shaft member 16 is proximate the midsection of the resultant shaft assembly 12. The area of greatest load on the shaft assembly is proximate the first shaft end 18, where pedal force loads are transferred from the right crank arm 38 and where chain and sprocket resistance forces are transferred from the sprocket bracket 68. By welding the right crank arm 38 to the first shaft end 18 of the first shaft member 14 and positioning the union of the first and second shaft members 14,16 away from the area of greatest load, the strength and useful life of the shaft assembly 12 is maximized.

In an alternative embodiment, pedals are either permanently or removably attached to the holes 50,52 at the second ends 54,56 of the crank arms 38,40. A pedal 80 is shown permanently attached to the second end 56 of the left crank arm 40 at the hole 52. The pedal 80 comprises a hollow pedal shaft 82 having a first pedal shaft end 84 and a second pedal shaft end 86. The diameter of the first pedal shaft end 84 is larger than the diameter of the second pedal shaft end 86 such that the pedal shaft's form is tapered from proximate the midsection 88 of the pedal shaft 82 to the second pedal shaft end 86. A generally conically shaped pedal housing 90 surrounds the tapered portion of the pedal shaft 82. A first pedal housing end 92 is attached to the midsection 88 of the pedal shaft 82 by a roller bearing 94. A second pedal housing end 96 is smaller than the first pedal housing end 92, and is attached to the second pedal shaft end 86 by a ball bearing 98. The roller and ball bearings 94,98 allow the pedal housing 90 to remain stationary while the pedal shaft 82 and the left crank arm 40 (to which the pedal shaft is welded) rotate. A U-shaped foot pedal 100 is attached to the pedal housing 90 by cross members 102. Although a standard pedal is illustrated, it is anticipated that a standard, clip-type, clipless or any other type of pedal can also be used.

Figure 3:
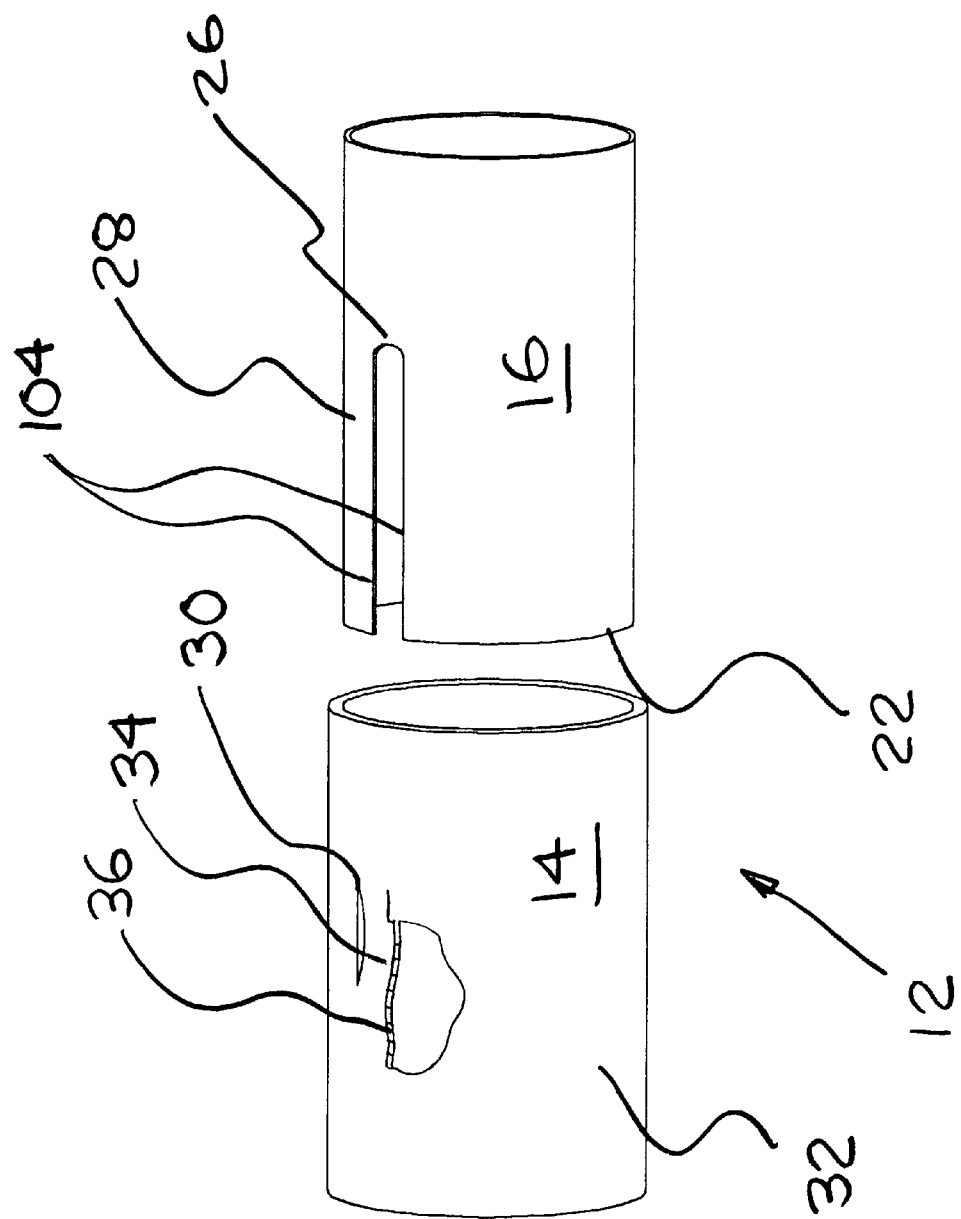
FIG. 3 is a perspective view of a preferred embodiment of a shaft assembly, exploded to show the alignment of the two members and the cooperation of the node with the key slot.

FIG. 3 is a perspective view of a shaft assembly 12, exploded to show the alignment of the first and second shaft members 14,16 and the cooperation of a node 34 within the key slot 26. The first shaft member 14 is partially cut away to show a node 34 formed in relief on the inner surface 36. The key slot 26 is formed through the second shaft member 16 from proximate the midsection 28 of the second shaft member 16 to the third shaft end 22, and is disposed in parallel with the longitudinal axis of the second shaft member 16. Opposite the depression 30 formed on the outer surface 32 of the first shaft member 14 is a node 34 comprising an area of relief formed on the inner surface 36 of the first shaft member 14 opposite the depression 30. The node 34 and the key slot 26 cooperate to provide a means for aligning the two shaft members 14,16 and in a predetermined disposition.

The location of the node 34 on the first shaft member 14 and the location of the key slot 26 on the second shaft member 16 cooperate to provide a means for aligning the two shaft members 14,16 in a position such that the right and left crank arms 38,40 are (not shown in FIG. 3 but shown in FIGS. 1 and 2) in a parallel and coplanar relationship. The cooperation of the node 34 and the key slot 26 is such that when the first and second shaft members 14,16 are joined, and the node 34 is slideably positioned within the key slot 26, the node 34 is restrained from rotational movement by the inner edges 104 of the key slot 26 such that there is no axial rotation between the first and second shaft members 14,16.

Although the preferred embodiment includes only one key slot 26 and node 34 assembly, those skilled in the art will realize that two or more key slot 26 and node 34 assemblies may equivalently be included.

The present invention has now been explained with reference to specific embodiments. Other embodiments will be apparent to those of ordinary skill in the art in light of this disclosure. Therefore it is not intended that this invention be limited, except as indicated by the appended claims.

I claim:

1. A crankshaft assembly for a bicycle comprising:
   a hollow cylindrical first shaft member having a first internal diameter, a first shaft end and a second shaft end;
   a hollow cylindrical second shaft member having a second external diameter smaller than the first diameter, a third internal diameter, a third shaft end and a fourth shaft end;
   expandable fastening means having an unexpanded diameter smaller than the third diameter, and being expandable to an expanded diameter larger than the third diameter;
   the first and second shaft members being detachably joined by inserting the third shaft end into the second shaft end and expanding said fastening means inside said third shaft end to create a rotatable shaft assembly, the union of the first and second shaft members being proximate a midsection of the shaft assembly; and
   means for rotating the shaft assembly, the means for rotating being permanently attached to the first and fourth shaft ends.

2. The crankshaft assembly as in claim 1, wherein the means for rotating comprise a crank arm attached to the shaft assembly.

3. The crankshaft assembly recited in claim 1 wherein said fastening means comprises an expansion bolt.

4. The crankshaft assembly as in claim 1, further comprising means for supporting a sprocket.

5. The crankshaft assembly as in claim 4, wherein the means for supporting the sprocket comprise a sprocket bracket attached to the first member proximate the first shaft end between a right crank arm and a first bearing.

6. The crankshaft assembly as in claim 1, wherein the first shaft member further comprises an inner surface and an outer surface, said inner surface includes a node formed thereon.

7. The crankshaft assembly as in claim 6, wherein the second shaft member has a slot formed parallel to a longitudinal axis of the second shaft member, the slot extending from the third shaft end to proximate a midsection of the second shaft member.

8. The crankshaft assembly as in claim 7, wherein the slot slideably engages the node when the second shaft end of the first shaft member is joined with the third shaft end of the second shaft member, to constrain rotational movement between the first and second shaft members.

9. The crankshaft assembly as in claim 1, wherein the means for rotating comprises:
   a right crank arm having a first crank arm end and a second crank arm end, the first crank arm end attached to the first shaft end of the first shaft member; and
   a left crank arm having a third crank arm end and a fourth crank arm end, the third crank arm end attached to the fourth shaft end of the second shaft member.

10. The crankshaft assembly as in claim 9, further comprising a first pedal attached to the second crank arm end of the right crank arm and a second pedal attached to the fourth crank arm end of the left crank arm.

11. The crankshaft assembly as in claim 10, wherein the first and second pedals are removably attached to the second and fourth crank arm ends.

12. The crankshaft assembly as in claim 1, further comprising means for covering the shaft assembly to protect the shaft assembly from damage and dirt.

13. The crankshaft assembly as in claim 12, wherein the means for covering the shaft assembly comprises a tubular housing that surrounds the shaft assembly.

14. The crankshaft assembly as in claim 13, wherein the tubular housing has a first housing end and a second housing end, where the first housing end is coupled to the first shaft member proximate the first shaft end by a first bearing, and the second housing end is coupled to the second shaft member proximate the fourth shaft end by a second bearing.

15. The crankshaft assembly as in claim 14, wherein the first bearing is larger in diameter than the second bearing to withstand greater torsional loads.

16. The crankshaft assembly as in claim 14, wherein each of the bearings comprises an annular flange having an inner side attached to the respective housing end, and an outer side containing ball bearings coupled to the respective shaft end, so that the flanges position the ball bearings outside the ends of the housing.

17. The crankshaft assembly as in claim 14, wherein the tubular housing further includes an outer surface and a frame member, the frame member attached to the outer surface for maintaining the housing in a fixed relationship with respect to the shaft assembly.

18. The crankshaft assembly as in claim 17, wherein the first and second bearings allow the shaft assembly to rotate with respect to the housing.

19. A crankshaft assembly for a bicycle comprising:

a hollow cylindrical first shaft member having a first internal diameter, a first shaft end and a second shaft end;

a hollow cylindrical second shaft member having a second external diameter smaller than the first diameter, a third shaft end and a fourth shaft end;

the first and second shaft members being detachably joined by inserting the third shaft end into the second shaft end to create a rotatable shaft assembly, the union of the first and second shaft members being proximate a midsection of the shaft assembly;

means for fastening together the second shaft end and the third shaft end including an expansion block assembly disposed within the second shaft member proximate the third shaft end, the expansion block assembly being expandable to cause the diameter of the third shaft end to enlarge, such that the expanded third shaft end in turn presses outwardly against the second shaft end to secure the engagement of the first and second shaft members; and means for rotating the shaft assembly, the means for rotating being permanently attached to the first and fourth shaft ends.

\* \* \* \* \*